(12) United States Patent
Madar, III

(10) Patent No.: US 12,093,114 B2
(45) Date of Patent: Sep. 17, 2024

(54) LOW-POWER VISION SENSING

(71) Applicant: Google LLC, Mountain View, CA (US)

(72) Inventor: Lawrence J. Madar, III, San Francisco, CA (US)

(73) Assignee: Google LLC, Mountain View, CA (US)

(*) Notice: Subject to any disclaimer, the term of this patent is extended or adjusted under 35 U.S.C. 154(b) by 163 days.

(21) Appl. No.: 17/777,968

(22) PCT Filed: Dec. 16, 2020

(86) PCT No.: PCT/US2020/065387
§ 371 (c)(1),
(2) Date: May 18, 2022

(87) PCT Pub. No.: WO2021/127030
PCT Pub. Date: Jun. 24, 2021

(65) Prior Publication Data
US 2022/0413592 A1  Dec. 29, 2022

Related U.S. Application Data

(60) Provisional application No. 62/949,386, filed on Dec. 17, 2019.

(51) Int. Cl.
*G06F 1/32* (2019.01)
*G06F 1/3234* (2019.01)
(Continued)

(52) U.S. Cl.
CPC ............ *G06F 1/3293* (2013.01); *G06F 1/325* (2013.01); *G06F 1/3287* (2013.01)

(58) Field of Classification Search
CPC ....... G06F 1/3293; G06F 1/325; G06F 1/3287
See application file for complete search history.

(56) References Cited

U.S. PATENT DOCUMENTS 9,710,265 B1   7/2017  Temam et al.
11,199,896 B2  12/2021 Madar, III et al.
(Continued)

FOREIGN PATENT DOCUMENTS

EP    2683204    1/2014
EP    3404508    11/2018
(Continued)

OTHER PUBLICATIONS

Office Action in Indian Appln. No. 202227005196, dated Oct. 13, 2022, 6 pages (with English translation).
(Continued)

*Primary Examiner* — Stefan Stoynov
(74) *Attorney, Agent, or Firm* — Fish & Richardson P.C.

(57) ABSTRACT

Methods, systems, and apparatus, for performing low-power vision sensing. One computing device includes a vision sensor configured to generate vision sensor data and an ambient computing system configured to repeatedly process the vision sensor data generated by the vision sensor according to a low-power detection process. If a detection is indicated by the low-power detection process, the ambient computing system wakes one or more other components of the computing device to perform a high-power detection process using the vision sensor data.

20 Claims, 2 Drawing Sheets

(51) Int. Cl.
  *G06F 1/3287* (2019.01)
  *G06F 1/3293* (2019.01)

(56) References Cited

U.S. PATENT DOCUMENTS

| | | | |
|---|---|---|---|
| 2007/0002386 A1 | 1/2007 | Iijima | |
| 2010/0332876 A1 | 12/2010 | Fields, Jr. et al. | |
| 2011/0103643 A1 | 5/2011 | Salsman et al. | |
| 2011/0134250 A1 | 6/2011 | Kim et al. | |
| 2011/0239020 A1 | 9/2011 | Thomas et al. | |
| 2013/0046967 A1 | 2/2013 | Fullerton et al. | |
| 2014/0013141 A1* | 1/2014 | Heo | G06F 1/3215 713/323 |
| 2014/0176572 A1 | 6/2014 | Vembu | |
| 2014/0347274 A1 | 11/2014 | Koh et al. | |
| 2014/0351559 A1 | 11/2014 | Lautner et al. | |
| 2015/0095678 A1 | 4/2015 | Nachman et al. | |
| 2015/0286263 A1 | 10/2015 | Heo et al. | |
| 2015/0346001 A1 | 12/2015 | Tripathi et al. | |
| 2016/0094814 A1 | 3/2016 | Gousev et al. | |
| 2016/0132099 A1 | 5/2016 | Grabau et al. | |
| 2016/0187961 A1 | 6/2016 | Elibol et al. | |
| 2017/0153992 A1 | 6/2017 | Nair et al. | |
| 2017/0205863 A1 | 7/2017 | Lee et al. | |
| 2017/0206464 A1 | 7/2017 | Clayton | |
| 2018/0136745 A1* | 5/2018 | Li | G06T 1/20 |
| 2018/0164871 A1 | 6/2018 | Chng et al. | |
| 2018/0173948 A1 | 6/2018 | Gousev et al. | |
| 2018/0246696 A1 | 8/2018 | Sharma et al. | |
| 2020/0278738 A1 | 9/2020 | Madar, III et al. | |
| 2020/0387734 A1* | 12/2020 | Sivalingam | G06V 20/20 |

FOREIGN PATENT DOCUMENTS

| | | |
|---|---|---|
| JP | 2007-013472 | 1/2007 |
| JP | 2013-115649 | 6/2013 |
| JP | 2014-082595 | 5/2014 |
| JP | 2016-086334 | 5/2016 |
| JP | 2018-501531 | 1/2018 |
| JP | 2020-532779 | 11/2020 |
| KR | 10-2015-0110653 | 10/2015 |
| KR | 10-2016-0145791 | 12/2016 |
| KR | 10-2017-0063595 | 6/2017 |
| KR | 10-2019-0085051 | 7/2019 |
| KR | 10-2019-0110545 | 9/2019 |
| KR | 10-2014-0005406 | 1/2024 |
| TW | 201812608 | 4/2018 |
| WO | WO 2015/183404 | 12/2015 |
| WO | WO 2019104228 | 5/2019 |

OTHER PUBLICATIONS

International Preliminary Report on Patentability in International Appln. No. PCT/US2018/062329, mailed on Jun. 4, 2020, 17 pages.
International Preliminary Report on Patentability in International Appln. No. PCT/US2020/065387, mailed on Jun. 30, 2022, 9 pages.
International Search Report and Written Opinion in International Appln No. PCT/US2018/062329, dated Apr. 10, 2019, 24 pages.
International Search Report and Written Opinion in International Appln. No. PCT/US2020/065387, dated Mar. 29, 2021, 14 pages.
Office Action in European Appln. No. 18815917.2, dated Apr. 13, 2021, 9 pages.
Office Action in Indian Appln. No. 201947047313, dated Jul. 6, 2021, 6 pages (with English translation).
Office Action in Korean Appln. No. 10-2019-7034766, dated Mar. 9, 2021, 24 pages (with English translation).
Office Action in Taiwanese Appln. No. 108137926, dated Jun. 29, 2021, 5 pages (with English Search Report).
Oord et al., "WaveNet: A Generative Model for Raw Audio," arXiv, Sep. 2016, 15 pages.
Office Action in Japanese Appln. No. 2022-532137, mailed on Sep. 5, 2023, 9 pages (with English translation).
Office Action in Korean Appln. No. 10-2022-7018259, dated May 1, 2024, 18 pages (with English translation).

* cited by examiner

LOW-POWER VISION SENSING

CROSS-REFERENCE TO RELATED APPLICATION

This application is a National Stage Application under 35 U.S.C. §371 of International Application No. PCT/US2020/065387, filed on Dec. 16, 2020, which claims the benefit of priority to U.S. Provisional Application Ser. No. 62/949,386, filed on Dec. 17, 2019. The disclosure of the prior applications are considered part of and are incorporated by reference in the disclosure of this application.

BACKGROUND

This specification relates to ambient computing.

Mobile computing devices, e.g., smart phones, personal digital assistants, electronic tablets, laptops, and the like, typically use power provided by one or more rechargeable batteries. A rechargeable battery provides only a finite amount of power to a device before the battery must be recharged, e.g., by applying an electric current to the battery. Recharging the battery of a mobile computing device generally requires connecting the mobile computing device to an electric grid, which reduces or eliminates its mobility. Consequently, reducing power consumption of mobile computing devices, thereby extending their battery life, is an important objective.

Mobile computing devices can include one or more peripheral sensors. For example, some mobile computing devices include microphones, cameras, accelerometers, and the like. Mobile computing devices can also include one or more processing components to process data collected by the one or more peripheral sensors. For example, some mobile computing devices include central processing units (CPUs), digital signal processors (DSPs), or other processing components.

Mobile computing devices can perform actions based on data collected by their one or more peripheral sensors and processed by their one or more processing components. For example, some mobile computing devices can perform actions in response to voice commands detected by a microphone and processed by a CPU. However, maintaining processing components in an active state so that they can process sensor data consumes significant amounts of power.

SUMMARY

This specification describes technologies for implementing low-power vision sensing on computing devices. These techniques allow for a variety of complex applications that rely on continual monitoring of vision sensor data to be run in low-power states.

The subject matter described in this specification can be implemented in particular embodiments so as to realize one or more of the following advantages. An ambient computing system can perform a variety of complex tasks based on vision sensing while consuming less power. This results in power savings and an increase in battery life.

These complex vision sensing tasks can be performed without waking up a main CPU cluster of a device. In addition, the architecture of the system can protect user privacy by preventing threads from the main CPU cluster from ever accessing the vision sensor data. This allows the ambient computing system to be more responsive to changes in its environment while also reducing power consumption. Accordingly, an ambient computing system can provide greater functionality with limited impact on the battery life of a computing device, and increase the total battery life of a computing device with complex ambient state.

According to a first aspect of the present disclosure, there is provided a computing device comprising: a vision sensor configured to generate vision sensor data; and an ambient computing system. The ambient computing system is configured to repeatedly process the vision sensor data generated by the vision sensor according to a low-power detection process, and, when a detection is indicated by the low-power detection process, to wake one or more other components of the computing device to perform a high-power detection process using the vision sensor data.

According to a second aspect of the present disclosure there is provided a computing device comprising: a vision sensor configured to generate vision sensor data, means for repeatedly processing the vision sensor data generated by the vision sensor according to a low-power detection process, and means for performing a high-power detection process when a detection is indicated by the low-power detection process.

The following features may be provided in combination with either of the first or second aspects.

The device may be configured to perform the low-power detection process with a first processing component and to perform the high-power detection process with a second processing element, wherein the first processing component consumes less power than the second processing component.

The second processing component may be disabled until a detection is indicated by the low-power detection process.

The computing device may further comprise a main machine learning engine having a plurality of compute tiles. The device may be configured to perform the high-power detection process using the main machine learning engine. The main machine learning engine may comprise the second processing element.

The device may be configured to perform the low-power detection process using fewer than all of the plurality of compute tiles of the main machine learning engine.

The computing device may further comprise an ambient machine learning engine. The device may be configured to perform the low-power detection process using the ambient machine learning engine. The ambient machine learning engine may comprise the first processing element.

The computing device may further comprise a main CPU cluster. The device may be configured to perform the low-power detection process and the high-power detection process without ever storing the vision sensor data in memory that is accessible by threads executing in the main CPU cluster.

The computing device may further comprise a camera and a main image signal processor (ISP) that is configured to process data generated by the camera. The device may be configured to use a private channel between a frame buffer storing vision sensor data and the main ISP to generate preprocessed vision sensor data for use during the high-power detection process. The private channel may not be accessible by threads executing in the main CPU cluster.

The vision sensor may be configured to generate a first frame rate for the low-power detection process and a second frame that is higher than the first frame rate for the high-power detection process.

The vision sensor may be configured to generate vision sensor data at a first resolution for the low-power detection process and a second resolution that is higher than the first resolution for the low-power detection process.

Said means for repeatedly processing the vision sensor data generated by the vision sensor according to a low-power detection process may comprise an ambient computing system. Said means for repeatedly processing the vision sensor data generated by the vision sensor according to a low-power detection process may be an ambient computing system.

When a detection is indicated by the low-power detection process, the ambient computing system may be further configured to wake one or more other components of the computing device to perform a high-power detection process using the vision sensor data. Said means for performing a high-power detection process when a detection is indicated by the low-power detection process may comprise said one or more other components of the computing device.

According to a third aspect of the present disclosure, there is provided a method comprising performing the operations performed by the computing device of either one of first or second aspects. The method may comprise generating, by a vision sensor of the computing device, vision sensor data; repeatedly processing the vision sensor data according to a low-power detection process; and performing a high-power detection process when a detection is indicated by the low-power detection process.

The method may comprise, repeatedly processing by an ambient computing system of the computing device the vision sensor data generated by the vision sensor according to the low-power detection process, and, when a detection is indicated by the low-power detection process, waking wake one or more other components of the computing device to perform the high-power detection process using the vision sensor data.

According to a further aspect of the present disclosure, there is provided one or more computer storage media encoded with computer program instructions that are operable, when executed by data processing apparatus, to cause the data processing apparatus to perform the operations of the first or second aspects, or the method of the third aspect.

It will be appreciated that optional features described above in the context of the first and second aspects may be used in combination with the third and further aspects also described above.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like components.

DETAILED DESCRIPTION

Figure 1:
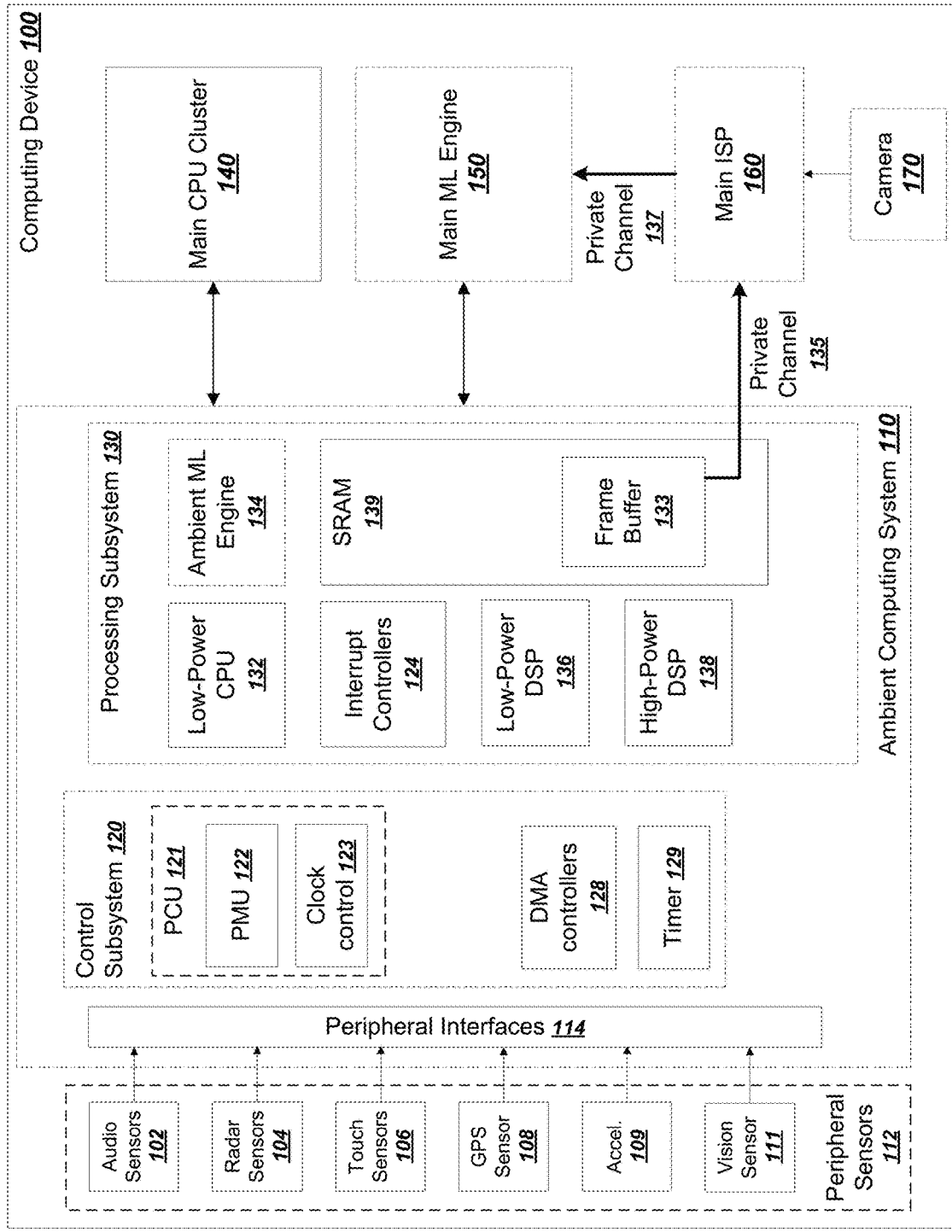
FIG. 1 is a diagram of an example computing device.

FIG. 1 is a diagram of an example computing device 100 that has low-power vision sensing capabilities. The device 100 is an example of a device that can use a low-power vision sensor to react to objects in its environment. The device 100 can be a system implemented in an any appropriate computing device, e.g., a smart phone, a smart watch, a fitness tracker, a personal digital assistant, an electronic tablet, or a laptop, to name just a few examples.

The system of computing device 100 can be used so that the computing device 100 can remain in a low-power state while continually processing inputs from a vision sensor 111. In this context, being in a low-power state means that one or more of the most powerful computing components are not used, which can mean that these devices are powered down partially or fully turned off. In FIG. 1, for example, the most powerful components include a main CPU cluster 140, a main machine learning (ML) engine 150, and a main image signal processor (ISP) (160). For brevity, these components will be referred to as the high-power components of the device because typically these devices consume more power when operational than the ambient computing system 110.

Thus, the device 100 can use the ambient computing system 110 to repeatedly process vision sensor data without using any of the high-power components. However, the high-power components can be woken if the ambient computing system 110 determines that a low-power detection has been made. In this specification, the terms wake and activate will be used to mean supplying an increased amount of power to a particular processing component or other electronics circuitry. The system may or may not have been supplying power to a processing component or other circuitry that is being awoken or activated. In other words, a component being awoken or activated may or may not have been completely powered down previously. Waking or activating a processing component can result in the processing component performing a boot process and causing instructions and data for the processing component to be loaded into random-access memory. Alternatively or in addition, waking or activating a processing component can include resuming from a previously suspended state.

In this specification, vision sensor data refers to a two-dimensional array of data elements generated by one or more light sensors of the vision sensor. Each data element can include one or more light intensity values, e.g., for red, blue, and green light. The vision sensor data can thus be stored as raw intensity values for each of the colors of light. Alternatively or in addition, each data element can store a single intensity value with no color information.

In this specification, a low-power detection means that data captured by the vision sensor 111 has been processed according to a low-power detection model and that the low-power detection model has indicated that further processing should be undertaken. The low-power detection can be performed by one or more of the low-power components of the processing subsystem 130, e.g., the low-power CPU 132, the low-power DSP, or an ambient ML engine 134.

If a low-power detection has been made, the device 100 can wake one or more of the main CPU cluster 140, the main ML engine 150, or the main ISP in order to further process the vision sensor data 111. These components can process the vision sensor data using more sophisticated and more refined models, which will be referred to as high-power detection models because they also utilize more powerful processing devices and thus consume more power.

One illustrative example of this technology is to use facial recognition in order to unlock a mobile phone. Full facial recognition models that have the sophisticated feature spaces required to reliably distinguish the faces of different users tend to consume a lot of power. It is thus impractical and inefficient to repeatedly run, on a device having finite battery power, a full facial recognition model on all data captured by the vision sensor.

Instead, the ambient computing system 110 can repeatedly process the data captured by the vision sensor 111 using a low-power detection model. The low-power detection model can be a model with fewer layers, fewer features, or operate on smaller input frames. Thus, the low-power detection model may only be able to distinguish human heads or human faces from other objects while not having the sophistication required to distinguish individual users from each other.

Thus, the device can use a low-power detection model to indicate with high reliability whether or not the vision sensor 111 is capturing data corresponding to a human head or face, but not any particular human head or face. If a low-power detection indicates that it is likely that the vision sensor 111 is capturing data of a human face, the ambient computing system 110 can wake one or more of the high-power components to execute the full facial recognition model in order to determine if the vision sensor 111 is capturing data of a particular human face, e.g., the human face of owner of the mobile phone. And, in the case of the phone unlock scenario, the system can use the output of the full facial recognition model in order to determine whether or not to unlock the phone.

In the low-power detection state, the ambient computing system 110 can instruct the vision sensor 111 to use a lower frame rate, a lower resolution, or both, than when in a high-power detection state. For example, in the low-power detection state, the vision sensor 110 can capture data at 140 pixel resolution at only 10 frames per second. Then, in the high-power detection state, the vision sensor 110 can switch to capturing data at 1080 pixel resolution at 30 frames per second.

In addition to preserving power, this arrangement also enhances user privacy while still providing for the capabilities to use advanced facial recognition models. In other words, in the low-power detection state, the vision sensor 111 is not capturing data that is of high enough quality that it could be used to identify any particular person. Thus, even if the mobile phone was compromised with malware that could read the data being captured by the vision sensor 111, the captured data would be useless for the purposes of identifying specific people in the data captured by the vision sensor 111 because the resolution is not high enough.

The device 100 can also optionally include an integrated camera 170, and can optionally include a main ISP 160 for processing images captured by the camera 170. Notably, the camera 170 can include a far higher resolution capabilities than the vision sensor 111. For example, the camera can capture 10, 20, or 30 megapixel images, while the vision sensor 111 might capture only a maximum of 2 megapixel images even when in the high-power detection mode.

The architecture of the ambient computing system 110 can also help to enhance user privacy. In particular, the ambient computing system 110 can be designed to prevent vision sensor data from leaking out into other components of the chip where they could be accessed by compromised software processes.

Thus, the ambient computing system 110 can allocate a dedicated frame buffer 133 in its SRAM 139 of the ambient computing system 110. In some implementations, the ambient computing system 110 allocates the frame buffer in a portion of the SRAM 139 that is not accessible by threads running the main CPU cluster 140 or the main ML engine 150. Thus, even if a software process running on the main CPU cluster 140 is compromised, the compromised process has no mechanism for accessing the frame buffer 133 that stores data captured by the vision sensor 111. This is because unlike a general purpose DRAM used by the main CPU cluster 140, the SRAM 139 is accessible only by the components of the ambient computing system 110, which might never run arbitrary user code.

In some situations, in order to provide for higher quality detections, the ambient computing system can borrow the processing pipeline of the main ISP 160. The main ISP 160 can be a hardware or software-implemented system that includes a pipeline of multiple functional components that process raw image data in sequence. For example, the main ISP 160 can have modules that apply linearization, black level correction, lens shading correction, white balance gain, and highlight recovery to generate a final output image.

The image processing pipeline of the main ISP 160 can be used to process raw image data captured by the full-resolution camera 170. In addition, in some implementations, the same processing pipeline of the main ISP can be used to enhance the data captured by the vision sensor 111.

In order to prevent data leakage of the data captured by the vision sensor 111, the computing device can have a private dedicated channel 135 from the frame buffer 133 to the main ISP 160. Being a private dedicated channel means that the architecture of the device 100 does not provide for any other devices reading from the channel 135. In other words, threads running on the main CPU cluster 140 have no mechanism for accessing data that is passed along the private channel 135.

Similarly, the device 100 can also implement a private channel 137 between the main ISP and the main ML engine 150. This allows the main ML engine 150 to execute very sophisticated models on high-quality data run through the main ISP 160 on channels that prevent such data from leaking out to other components of the device 100 where they could be read by compromised threads running the main CPU cluster 140.

Another use case for the different power detection levels is translating text from one language to another. The ambient computing system 110 can continually run a low-power optical character recognition (OCR) model on data received by the vision sensor. The low-power OCR model indicating a low-power detection means that the vision sensor 111 is picking up an image having text, e.g., on a sign or on a piece of paper. The ambient computing system 110 can thus wake the main ML engine 150 to run a full, high-power translation model on the text recognized from the vision sensor. The output can then be provided to the user, e.g., on an ambient display or on an ambient text-to-speech model. In this way, the device can both continually search for text to translate, can detect text, and can automatically perform a full translation of any captured text and output the results all while never waking the main CPU cluster 140.

The one or more components of the computing device 100 can be implemented on a system on a chip (SoC) within the computing device. An SoC can be an integrated circuit that includes each component of the system on a single silicon substrate or on multiple interconnected dies, e.g., using silicon interposers, stacked dies, or interconnect bridges. Other components of the computing device, including a main CPU cluster 140, can be implemented on the same or on a separate die. The computing device 100 may include components, including the sensors 112, one or more displays, a battery, and other components, that are separate from and independent of the SoC, and may for example be mounted on a common housing.

Briefly, and as described in further detail below, the device 100 includes a number of peripheral sensors 112 configured to generate sensor signals based on input from the environment of the computing device. The device 100 includes a control subsystem 120 for controlling the supply of power and sensor signals to components in the system. And the device 100 includes a processing subsystem 130 for processing sensor signals and generating outputs.

The device 100 also includes a main CPU cluster 140. The main CPU cluster 140 is a component of the computing device that includes one or more general-purpose processors that are separate from the devices in the processing subsystem 130. The processors of the main CPU cluster 140 generally have more computing power than any of the devices in the processing subsystem 130, and therefore, the processors of the main CPU cluster 140 may also consume more power than any of the devices in the processing subsystem 130.

The device 100 can also optionally include a main machine learning (ML) engine 150. The main ML engine 150 is a special-purpose processing device that is configured to perform inference passes through one or more machine learning models. Each inference pass uses inputs and learned parameter values of a machine learning model to generate one or more outputs predicted by the learned model. The main ML engine 150 can include one or more compute tiles. In general, a compute tile is a self-contained computational component configured to execute a set of computations independently. Tiles used for accelerating machine learning typically have massively parallel architectures. In some implementations, each compute tile includes a grid of computational arrays, with each element in the computational array being a processing element that can independently execute mathematical operations. Thus, for example, to compute a single 3×3 convolution, a tile can use 9 computational arrays in parallel, with each computational array performing 16 or 32 tensor multiplications in parallel between the inputs and the weights of the model. A suitable machine learning engine having multiple compute tiles is described in U.S. Pat. No. 9,710,265, which is incorporated herein by reference.

The tiles of the main ML engine 150 can be arranged in a network and programmed so that each tile of the main ML engine 150 is configured to perform operations of one portion of an inference pass through the machine learning model. For example, if the machine learning model is a neural network, each tile in the main ML engine 150 can be configured to compute the computations of one layer of the neural network.

The main ML engine 150 provides higher performance computing power than any of the devices in the processing subsystem 130 of the ambient computing system 110. Therefore, the main ML engine 150 also consumes more power than any of the devices in the processing subsystem 130.

The processing subsystem 130 optionally includes an ambient machine learning engine 134. The ambient ML engine 134 is also a special-purpose processing device that is arranged within the ambient computing system 110 and configured to perform inference passes through one or more machine learning models. When the device 100 includes both a main ML engine 150 and an ambient ML engine 134, the ambient ML engine 134 has fewer compute tiles and therefore has less processing power than the main ML engine 150 and consumes less power than the main ML engine 150. For example, the ambient ML engine 134 can be implemented as one or two tiles, whereas the main ML engine 150 can have 8-16 or more interconnected tiles.

As described above, the processing subsystem 130 can save power by performing low-power detections of vision sensor data using an ambient ML engine 134, and can then perform high-power detections using the fully enabled ML engine 150.

Alternatively or in addition, the ambient computing system 110 can reconfigure the main ML engine 150 to operate in a reduced power mode. In the reduced power mode, fewer than all compute tiles are enabled. Thus, some compute tiles might not be used, while other compute tiles might be used repeatedly for different portions of the inference pass. For example, the system can enable a single tile on the main ML engine 150 and can use the single tile to compute all layers of a neural network for low-power detections. Of course, using a single tile makes computing detections slower, but it also consumes power at a lower rate. In addition, as described above, the vision sensor can generate data at a lower frame rate for low-power detections. Thus, the decrease in processing speed due to using one compute tile may still be enough to compute one inference pass per frame. Other configurations are possible, e.g., a reduced power mode that uses 2, 4, 8, 16, or some other proper subset of tiles in the main ML engine 150.

An advantage to using a reduced power mode of the main ML engine 150 is reduced chip size and cost due to not needing to include a separate compute tile within the ambient computing system to implement the ambient ML engine 134.

Although not depicted, the computing device 100 can also include one or more other components commonly found on such computing devices, e.g., a display, a modem, a graphics processing unit, a display processor, or a special-purpose image processor, to name just a few examples. These components can be powered down during the low-power states described below and activated if the system determines that the sensor signals match an application requiring their activation.

The device 100 includes a number of peripheral sensors 112. The peripheral sensors 112 include one or more audio sensors 102, one or more radar sensors 104, one or more touch sensors 106, a Global Positioning System (GPS) sensor 108, and an accelerometer 110. The system can include additional, fewer, or alternative peripheral sensors. For example, the system can include a Wi-Fi signal detector, a cellular signal detector, a barometer, a thermometer, a magnetometer, or other types of peripheral sensors.

The peripheral sensors 112 can be devices configured to generate sensor signals in response to environmental inputs. The one or more audio sensors 102, e.g., microphones, can generate audio signals based on sounds in the environment. For example, the audio sensors 102 can generate audio signals corresponding to human speech. The one or more radar sensors 104 can detect radar signals based on reflected radio waves emitted by a transmitter of the computing device. Variations in reflected radio waves can indicate movement in the environment. For example, the radar sensors 104 can generate radar signals that are received due to being reflected off of the user, e.g., when the user is making gestures in proximity to the computing device. Similarly, the one or more touch sensors 106 can generate signals due to touch gestures made by a user of the computing device on a presence-sensitive or pressure-sensitive interface of the device. The GPS sensor 108 can generate signals in response to received location data communications. And the accelerometer 109 can generate signals due to accelerations experienced by the computing device. And as described above, the vision sensor 111 can generate vision sensor data, which can have a lower resolution and framerate for performing low-power detections. In this specification, whenever sensor signals are described as being inputs to other processing components, the inputs can be analog electrical signals generated by the sensors themselves, digital representations of the sensor signals, or processed digital representations of the sensor signals that represent one or more properties of the original signals. The peripheral sensors of the computing device 100 can also include an inertial measurement sensor, a barometer, a specific absorption rate proximity sensors, and WiFi network name sensors, to name just a few other examples.

The ambient computing system 110 includes one or more peripheral interfaces 114. The peripheral interfaces 114 can be a component of the computing device 100 that is powered on even when the device is in its lowest power state. The peripheral interfaces 114 can include any appropriate peripheral interface for converting inputs received from the peripheral sensors 112 into sensor signals to be used by the ambient computing system 110. For example, the peripheral interfaces 114 can include a pulse density modulation (PDM) interface, an inter-IC sound (I2S) interface, an inter-integrated circuit (I2C) interface, an I3C interface, a time division multiplexed (TDM) interface, and a serial peripheral interface (SPI), to name just a few examples.

Each of the peripheral interfaces 114 is configured to generate a respective interrupt upon detecting an environmental input. In general, each interrupt can identify a source of the sensor data, e.g., an identifier of a peripheral interface or sensor responsible for the interrupt. The interrupts are received and processed by one or more interrupt controllers 124. For example, upon receiving an interrupt, the interrupt controller 124 can wake a power control unit (PCU) 121, which includes a power management unit (PMU) 122 and a clock control unit 123. The PMU 122 can control which components of the device 100 receive power and how much power each component receives. The clock control unit 123 can control the frequency at which the components of the device 100 operate. In some implementations, each processing component has a different clock frequency that is a multiple or a fraction of a base clock frequency. By having a clock frequency that is a multiple or a fraction of a base clock frequency, each processing component can more efficiently exchange signals with other processing components.

Upon receiving an interrupt, the PCU 121 can determine based on the source of the interrupt which other components of the ambient computing system 110 should be activated in order to further process the sensor signals causing the interrupt. In order to provide processing support for such components, the PCU 121 can wake the static random access memory (SRAM) 139 and the system communications fabric. The fabric is a communications subsystem that communicatively couples the internal components of the ambient computing system 110, their communications to external components, or some combination of these. The fabric can include any appropriate combination of communications hardware, e.g., buses or dedicated interconnect circuitry.

The static random access memory (SRAM) 139 can be a general purpose random-access memory device that can be shared by multiple processing components of the processing subsystem 130. For example, the SRAM 139 can store sensor signals, processor instructions and data, system outputs, and other data, e.g., neural network parameters of neural network models that are or will be implemented by the ambient ML engine 134. In general, an SRAM is distinguishable from dynamic random-access memory (DRAM) in that an SRAM need not be periodically refreshed. As described in more detail below, the SRAM 139 is accessible to the processing components in the processing subsystem 130 directly or through one or more DMA controllers. In some implementations, the SRAM 139 includes multiple banks, which can each store substantially similar amounts of data, e.g., 1, 10, or 100 MB each. In addition, each individual bank can include multiple blocks that can be individually powered-down when entering the low-power state. By carefully sequencing the order that the blocks are powered-down amongst the four banks, the SRAM address space can remain contiguous.

When the PCU 121 wakes the SRAM 139, the PCU 121 can wake fewer than all of the blocks or all of the memory banks of the SRAM 139. The PCU 121 can instead wake only a number of blocks that is sufficient for the next component of the processing subsystem 130 to determine whether to further escalate powering up of components of the device 100.

The PCU 121 can also supply different power levels to different blocks of the SRAM 139. For example, in the monitoring power state, the PMU 122 can supply a lower, retention voltage to the entire SRAM 139 to reduce its power consumption. The PMU 122 can also supply the retention voltage to the SRAM 139 if no processing components need to access to the SRAM 139. In the processing power state, the PMU 122 can provide normal voltage to all or portions of the SRAM 139 and lowered or no voltage to other parts of the SRAM 139.

During the process of handling an interrupt, the ambient computing system 110 can also wake one or more DMA controllers 128. The DMA controllers 128 can manage DMA pathways that allow higher data bandwidth for incoming sensor signals. For example, a DMA controller 128 can be used to continuously stream audio data from a microphone into the SRAM 139 for access by processing components in the processing subsystem 130. Conversely, a DMA controller can also be used to continuously stream audio data stored in the SRAM 139 for output as sound through one or more speakers. As another example, a DMA controller 128 can be used to stream vision sensor data from the vision sensor 111 into the SRAM 139. The DMA controllers 128 can also be used to stream any appropriate sensor data into the SRAM 139, but using programmed IO may be computationally cheaper than activating a DMA controller for small quantities of data. Thus, the ambient computing system 110 can activate and use the DMA controllers 128 for relatively high-bandwidth sensor data, e.g., audio data and radar data, and can used programmed IO for other types of sensor data.

After preparing the fabric and the SRAM 139, the PCU 121 can then use the interrupts to determine which other components of the processing subsystem 130 to wake. For example, the PMU 122 can control whether power is provided to the low-power CPU 132, the low-power DSP 136, or other components of the processing subsystem 130 depending on which of one or more sensors generated an interrupt. In some implementations, the peripheral interfaces 114 and the components of the control subsystem 120 are the only components of the device 100 that are powered on in a monitoring power state, which is a power state in which the system is waiting to receive interrupts due to environmental inputs to the computing device.

The processing components of the processing subsystem 130 include a low-power CPU 132, an ambient ML engine 134, a low-power DSP 136, and a high-power DSP 138. In some implementations, the processing subsystem has multiple instances of one or more of these components, e.g., multiple low-power DSPs or multiple high-power DSPs. For example, the processing subsystem 130 can have one high-power DSP that is dedicated to processing audio signals and a separate high-power DSP that is dedicated to processing radar signals. Alternatively or in addition, the processing subsystem 130 can have a high-power DSP that is dedicated to processing vision sensor data generated by the vision sensor 111.

In the monitoring power state, the processing components in the processing subsystem 130 can be maintained in a retention mode. The PCU 121 can maintain a component in retention mode by reducing or eliminating power that is provided to the component. For example, in the retention mode, the PCU 121 can supply a processing component with just enough power to maintain register states, but not enough power to process data in the registers.

The low-power CPU 132 can be a general-purpose programmable processor that includes registers, control circuitry, and an arithmetic logic unit (ALU). In general, the low-power CPU 132 consumes less power than the main CPU cluster 140 of the computing device, and may contain fewer processing cores. In some implementations, the low-power CPU 132 is primarily a scalar processor that operates on single instructions and single data inputs.

The low-power DSP 136 and the high-power DSP 138 can be special-purpose processors configured for efficient decoding and processing of highly-vectorized signals. The processing subsystem 130 can include a variety of DSPs that are designed for different purposes. For example, the processing subsystem 130 can include a DSP that is configured to process vision sensor data, a DSP that is configured to process audio signals, a DSP that is configured to perform dataplane algorithms, a DSP that is configured to process wireless communications signals, and a DSP that is configured to process GPS signals, to name just a few examples. In general, high-power DSPs consume higher levels of power than low-power DSPs because they have more active registers, they access and process more data in parallel, because they rely more heavily on memory operations, or some combination of these.

In operation, the low-power CPU 132 can receive interrupts and sensor signals when the system enters the processing power state. Based on the type of sensor signals the lower-power CPU 132 receives and based on the properties of those sensor signals, the low-power CPU 132 can determine that other components of the system should be activated, e.g., the communications fabric, the DMA controllers 128, the SRAM 139, or some combination of these. After activating these components, the low-power CPU 132 can optionally return to a non-operational state.

To support low-power detections, the low-power CPU 132 can wake other components of the processing subsystem 130 when vision sensor data is received. As described above, this can include waking an ambient ML engine 134 to perform a low-power detection on vision sensor data stored in the frame buffer 133 of the SRAM 139. Alternatively or in addition, the low-power CPU 132 can wake the main ML engine 150 in a low-power mode in which fewer than all tiles are enabled. The low-power CPU 132 can then stream data in the frame buffer 133 to the main ML engine 150 to perform the low-power detections.

In some implementations, the vision sensor data is first preprocessed by a software image processing pipeline that is executed by one or more components of the processing subsystem. For example, the low-power DSP 136 or the high-power DSP 138 can perform one or more stages of an image processing pipeline to enhance the vision sensor data before being used for low-power detections. These components can execute the image processing pipeline using instructions stored in a portion of the SRAM 139.

In some other implementations, the vision sensor data is preprocessed by a special-purpose image processing device.

For example, the high-power DSP 138 can be a two-dimensional DSP that is specifically designed for processing vision sensor data. The high-power DSP 138 can be configured to operate on the same resolution and framerate that the vision sensor 111 generates for low-power detections.

If the result of the low-power detection is positive, the low-power CPU 132 can wake higher powered components to perform a high-power detection process. This can include waking the main CPU cluster 140, the main ML engine 150, the main ISP 160, or some combination of these. Alternatively or in addition, the high-power detection can be performed by another component of the ambient computing system 110, e.g., the high-power DSP 138. As described above, the high-power detections may operate on vision sensor data that is preprocessed by an image processing pipeline implemented by the main ISP 160 or another component of the ambient computing system 110. If the image preprocessing is performed by the main ISP 160, the ambient computing system 110 can wake the main ISP 160 upon receiving an indication that the low-power detection was positive. If the image preprocessing is performed by another component of the ambient computing system 110, the results may be less sophisticated, but with the advantage that the main ISP 160 does not need to be powered on. The control subsystem 120 can also include a timer 129, which is an electronic timer that can detect system malfunctions and resolve those malfunctions. During normal operation, the system can regularly reset the timer 129 to prevent the timer 129 from timing out. If, e.g., due to a hardware fault or a program error, the system fails to reset a timer, the timer will elapse and generate a timeout signal. The timeout signal can be used to initiate one or more corrective actions. A corrective action can include placing the system in a safe state and restoring normal system operation.

Figure 2:
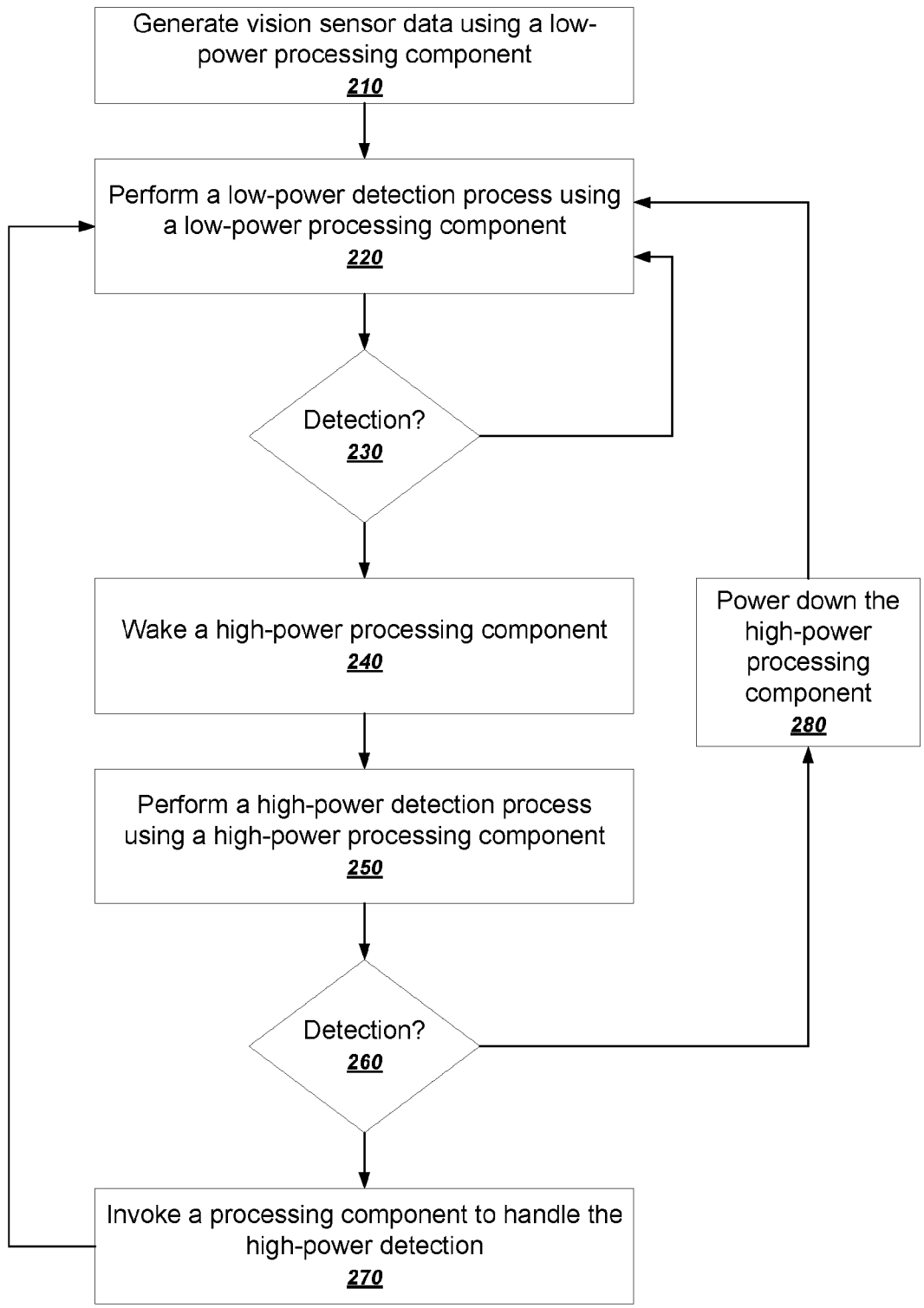
FIG. 2 is a flowchart of an example process for performing a two-stage vision detection process.

FIG. 2 is a flowchart of an example process for performing a two-stage vision detection process. As described above, an ambient computing system can use a low-power processing component to perform a low-power detection process on vision sensor data, and, if a detection is indicated, use a high-power processing component to perform a high-power detection process. The example process will be described as being performed by a system having a vision sensor, a low-power processing component, and high-power processing component, e.g., the computing device 100 of FIG. 1.

The system generates vision sensor data using a vision sensor (210).

The system performs a low-power detection process using a low-power processing component (220). As described above, a low-power processing component can be any of the devices on the ambient computing system or a main ML engine that is partially enabled. In general, the low-power processing component consumes less power than a main CPU cluster or a main ML engine when fully enabled. In addition, during the low-power detection process, the vision sensor can be configured to generate data at a lower framerate, a lower resolution, or both.

If no detection is indicated by the low-power detection process (230), the system again repeats the low-power detection process using the next captured vision sensor data (branch to 220).

If a detection is indicated by the low-power detection process (230), the system wakes a high-power processing component (branch to 240). As described above, this can mean supplying power to a high-power processing component when none was supplied before, increasing power to a high-power processing component, or enabling additional capabilities of the high-power processing component. For example, the system can wake additional compute tiles of a machine learning engine.

The system performs a high-power detection process using a high-power processing component (250). As described above, the high-power processing component can be a main ML engine or a DSP of the ambient computing system. The high-power detection process can either use the already captured vision sensor data, or updated vision sensor data.

If no detection is indicated by the high-power detection process (260), the system can again power down the high-power processing component to its original state (branch to 280) and repeat the low-power detection process using the next captured vision sensor data (220). Alternatively or in addition, the system can perform multiple iterations of the high-power detection process before switching back to performing the low-power detection process.

If a detection is indicated by the high-power detection process (260), the system can invoke a processing component to handle the high-power detection (branch to 270). For example in the phone unlock scenario, the system can invoke the main CPU cluster to unlock the phone.

For some applications, the system invokes a processing component to process the output of the high-power detection process regardless of the results of the process. For example, in the application of automatic text translation, the system can repeatedly output, to a display of the device, results of the high-power text translation process regardless of the results of that process.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client device having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what is being or may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computing device comprising:
    a vision sensor configured to generate vision sensor data;
    an ambient computing system configured to repeatedly process the vision sensor data generated by the vision sensor according to a low-power detection process, and when a detection is indicated by the low-power detection process, to wake one or more other components of the computing device to perform a high-power detection process using the vision sensor data; and
    a main machine learning engine having a plurality of compute tiles, wherein the device is configured to perform the high-power detection process using the main machine learning engine.

2. The computing device of claim 1, wherein the device is configured to perform the low-power detection process with a first processing component and to perform the high-power detection process with a second processing element, wherein the first processing component consumes less power than the second processing component.

3. The computing device of claim 2, wherein the second processing component is disabled until a detection is indicated by the low-power detection process.

4. The computing device of claim 1, wherein the device is configured to perform the low-power detection process using fewer than all of the plurality of compute tiles of the main machine learning engine.

5. The computing device of claim 1, further comprising an ambient machine learning engine, wherein the device is configured to perform the low-power detection process using the ambient machine learning engine.

6. The computing device of claim 1, further comprising a main CPU cluster, wherein the device is configured to perform the low-power detection process and the high-power detection process without ever storing the vision sensor data in memory that is accessible by threads executing in the main CPU cluster.

7. The computing device of claim 1, further comprising a camera and a main image signal processor (ISP) that is configured to process data generated by the camera, and wherein the device is configured to use a private channel between a frame buffer storing vision sensor data and the main ISP to generate preprocessed vision sensor data for use during the high-power detection process.

8. The computing device of claim 7, wherein the private channel is not accessible by threads executing in a main CPU cluster of the computing device.

9. The computing device of claim 1, wherein the vision sensor is configured to generate a first frame rate for the low-power detection process and a second frame that is higher than the first frame rate for the high-power detection process.

10. The computing device of claim 1, wherein the vision sensor is configured to generate vision sensor data at a first resolution for the low-power detection process and a second resolution that is higher than the first resolution for the low-power detection process.

11. A method comprising:
    generating, by a vision sensor of a computing device, vision sensor data;
    repeatedly processing, by an ambient computing system of the computing device, the vision sensor data generated by the vision sensor according to a low-power detection process; and
    when a detection is indicated by the low-power detection process, waking, by the ambient computing system, one or more other components of the computing device to perform a high-power detection process using the vision sensor data, wherein performing the high-power detection processes comprises using a main machine learning engine having a plurality of compute tiles.

12. The method of claim 11, further comprising disabling a processing component that performs the high-power detection process until a detection is indicated by the low-power detection process.

13. The method of claim 11, further comprising performing the low-power detection process using fewer than all of the plurality of compute tiles of the main machine learning engine.

14. The method of claim 11, further comprising performing the low-power detection process using an ambient machine learning engine.

15. The method of claim 11, further comprising:
    performing the low-power detection process and the high-power detection process without ever storing the vision sensor data in memory that is accessible by threads executing in a main CPU cluster.

16. The method of claim 11, further comprising:
    performing the high-power detecting process by using a private channel between a frame buffer storing vision sensor data and a main signal processor (ISP) to generate preprocessed vision sensor data, wherein the main ISP is configured to process data generated by a camera.

17. A computing device comprising:
    a vision sensor configured to generate vision sensor data;
    an ambient computing system configured to repeatedly process the vision sensor data generated by the vision sensor according to a low-power detection process, and when a detection is indicated by the low-power detection process, to wake one or more other components of the computing device to perform a high-power detection process using the vision sensor data;
    a main CPU cluster, wherein the device is configured to perform the low-power detection process and the high-power detection process without ever storing the vision sensor data in memory that is accessible by threads executing in the main CPU cluster.

18. The computing device of claim 17, further comprising:
a camera and a main image signal processor (ISP) that is configured to process data generated by the camera, and wherein the device is configured to use a private channel between a frame buffer storing vision sensor data and the main ISP to generate preprocessed vision sensor data for use during the high-power detection process.

19. A method comprising:
generating, by a vision sensor of a computing device, vision sensor data;
repeatedly processing, by an ambient computing system of the computing device, the vision sensor data generated by the vision sensor according to a low-power detection process; and
when a detection is indicated by the low-power detection process, waking, by the ambient computing system, one or more other components of the computing device to perform a high-power detection process using the vision sensor data, wherein performing the high-power detection processes comprises using a main machine learning engine having a plurality of compute tiles; and
performing the low-power detection process and the high-power detection process without ever storing the vision sensor data in memory that is accessible by threads executing in a main CPU cluster.

20. The method of claim 19, further comprising:
performing the high-power detecting process by using a private channel between a frame buffer storing vision sensor data and a main signal processor (ISP) to generate preprocessed vision sensor data, wherein the main ISP is configured to process data generated by a camera.

* * * * *